DAVID HENDERSON.

Improvement in Fly Traps.

No. 123,897. Patented Feb. 20, 1872.

Witnesses.
S. N. Piper.
L. N. Möller

David Henderson.
by his attorney.
R. H. Eddy

123,897

UNITED STATES PATENT OFFICE.

DAVID HENDERSON, OF NORTH BRIDGEWATER, MASSACHUSETTS.

IMPROVEMENT IN FLY-TRAPS.

Specification forming part of Letters Patent No. 123,897, dated February 20, 1872.

*To all persons to whom these presents may come:*

Be it known that I, DAVID HENDERSON, of North Bridgewater, of the county of Plymouth and State of Massachusetts, have invented a new and useful Improvement in Fly or Insect Traps; and do hereby declare the same to be fully described in the following specification, and represented in the accompanying drawing, of which—

Figure 1:
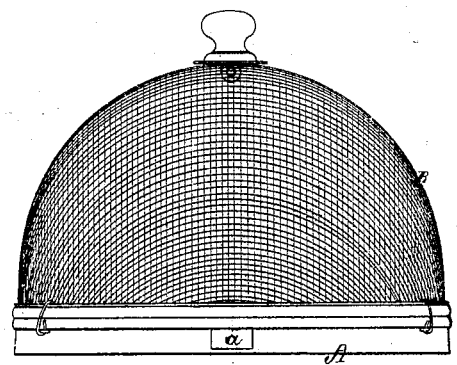
Figure 2:
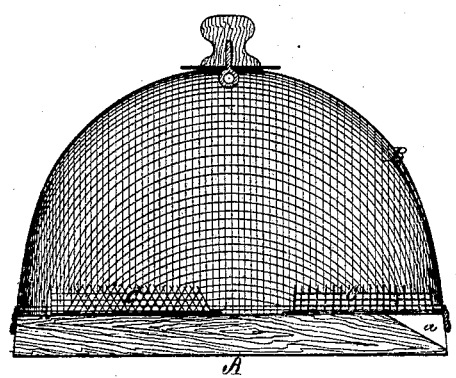
Figure 3:
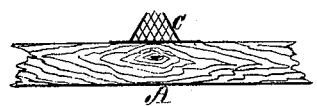

Figure 1 is a side elevation; Fig. 2, a vertical section of one of my improved traps. Fig. 3 is a transverse section of one of the entrapping-galleries.

My improvement has reference to the form and construction of the entrapping-galleries.

Common rat or mouse traps made of wire and having the general form of my trap have had entrance-passages formed of a series of wires arranged in a conical form, or inclining toward each other from the inlet, the common axis of the series of cells being horizontal, or about so. Such an entrapping-passage, though answering well for an animal, I have found will be of little or no service in entrapping flies or insects.

My entrapping-passage is a long gallery, open along its top and at its outer end, closed at its inner end, and composed of interwoven wires, arranged as shown. The bottom of the gallery at the entrance is inclined, as shown at *a* in Fig. 2, in which A denotes the base-board, and B the body of the trap, such body having a semi-spherical or other proper form, and being composed of woven wire. It is held to the base by hooks or other suitable devices, admitting of the two being easily separated, as occasion may require. To the trap there may be one or more such galleries, which are shown at C C, the section exhibited in Fig. 2 being taken through the axis of one of the galleries.

With the gallery opened at top, and formed in part of a series of points or pointed wires, convergent toward each other, as shown, a fly, on peering into the trap at the entrance of a gallery, will see through the long opening at the top of the gallery, and will find it an easy matter to pass into the gallery and out thereof at its top, and thence into the trapping-chamber, to which the gallery may lead. The points of the wires will prevent any return or escape of the fly or insect from the trapping-chamber into the gallery.

This trap has been found in practice to be exceedingly useful and efficient for the purpose for which it is intended, especially for the entrapping of flies. It may also be employed to advantage in catching cockroaches, water-bugs, and various other pestiferous insects, such as are common to or frequent the habitations of men.

I make no claim to the trap or anything shown or described in the United States patent No. 19,382, wherein the entrance-passage to each fly-receiver is located at and through the middle of its bottom, and provided with converging wires.

In my trap the entrance-passage is an inclined notch formed in the bottom at its periphery and to open out of such; and extended from such passage is a long gallery, made of pointed wires and closed at its inner end, open at top, and based on the floor of the trap, all of which differs essentially from what is shown in such patent. The long gallery, with its inclined mouth or opening, is more advantageous in entrapping flies or insects.

I therefore claim—

My improved insect or fly trap, constructed as described, viz., with the inclined mouth *a*, arranged, as shown, in the bottom board at its periphery, and also with the gallery C, closed at its inner end and open at top, and to lead from such inclined mouth, in manner, and to be composed of pointed wires, as described.

DAVID HENDERSON.

Witnesses:
R. H. EDDY,
J. R. SNOW.